(12) United States Patent
Przybysz et al.

(10) Patent No.: US 8,266,302 B2
(45) Date of Patent: Sep. 11, 2012

(54) EVALUATING INITIAL FILTER CRITERIA

(75) Inventors: Hubert Przybysz, Hägersten (SE); Alf Heidermark, Saltsjöbaden (SE); Timo Forsman, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 298 days.

(21) Appl. No.: 12/522,398

(22) PCT Filed: Jan. 16, 2007

(86) PCT No.: PCT/EP2007/050413
§ 371 (c)(1),
(2), (4) Date: Nov. 11, 2009

(87) PCT Pub. No.: WO2008/086887
PCT Pub. Date: Jul. 24, 2008

(65) Prior Publication Data
US 2010/0088421 A1    Apr. 8, 2010

(51) Int. Cl.
*G06F 15/16* (2006.01)
(52) U.S. Cl. ....................................... 709/228
(58) Field of Classification Search .................. 709/228
See application file for complete search history.

(56) References Cited

U.S. PATENT DOCUMENTS

2004/0193727 A1*  9/2004  Varga et al. .................... 709/238
2008/0104696 A1*  5/2008  Ll et al. ............................ 726/21

FOREIGN PATENT DOCUMENTS

WO    WO 2004/086723 A    10/2004
WO    WO 2006/125474 A    11/2006

OTHER PUBLICATIONS

"Enhanced Initial Filter Criteria for 3GPP IMS" IP.Com Journal, IP.Com Inc., West Henrietta, NY, US, Jul. 18, 2006. XP013115124 ISSN: 1533-0001 the whole document.
Van Elburg Ericsson Telecommunicatie B V J: "The Session Initiation Protocol (SIP) P-Served-User Private-Header (P-Header)" IETF Standard-Working-Draft, Internet Engineering Task Force, IETF, CH, Apr. 16, 2007, XP015050517 ISSN: 0000-00004 the whole document.
Stadler, Johannes. IP Multimedia Subsystem. Sep. 2005. www.3g4g. co.uk/Ims/IMS_Tutorial_050331_Prt_IIb.pdf.

* cited by examiner

*Primary Examiner* — Jeffrey Nickerson

(57) ABSTRACT

A method of evaluating Initial Filter Criteria (IFC) at a terminating Serving Call Session Control Function (S-CSCF) in an IP Multimedia Subsystem network. Upon receiving a Session Initiation Protocol (SIP) message containing a destination Uniform Resource Identifier (URI), the S-CSCF applies an Initial Filter Criterion to the message, sends the message to an Application Server (AS), and suspends further IFC evaluation. When a return message is received from the AS, the S-CSCF determines whether the AS changed the URI. If so, the S-CSCF makes a determination of whether to resume IFC evaluation. If the AS did not change the URI, the S-CSCF resumes IFC evaluation.

10 Claims, 5 Drawing Sheets

EVALUATING INITIAL FILTER CRITERIA

FIELD OF THE INVENTION

The invention relates to a method and apparatus for evaluating Initial Filter Criteria in an IP Multimedia Subsystem network.

BACKGROUND TO THE INVENTION

IP Multimedia (IPMM) is an example of a service that provides a dynamic combination of voice, video, messaging, data, etc, within the same session. By growing the numbers of basic applications and the media that it is possible to combine, the number of services offered to the end users will grow, and the inter-personal communication experience will be enriched. This will lead to a new generation of personalised, rich multimedia communication services, e.g. peer-to-peer multimedia communication, IPTV etc.

These services can be based on the IP Multimedia Subsystem (IMS) architecture, which is the technology defined by the Third Generation Partnership Project (3GPP) to provide IP Multimedia services over mobile communication networks (3GPP TS 22.228, TS 23.228, TS 24.229, TS 29.228, TS 29.229, TS 29.328 and TS 29.329 Releases 5 to 7).

The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. FIG. 1 illustrates schematically how the IMS fits into the mobile network architecture in the case of a 3GPP PS access domain.

Services can be provided to a user via an IMS network using an Application Server (AS). Service provision is triggered using one or more Initial Filter Criteria (IFC), stored in a user's profile and downloaded to the user's Serving-Call Session Control Function (S-SCSF) when the user registers with the IMS network. An IFC is composed of trigger points and the address of one or more AS. The trigger point describes conditions that must be checked to discover whether or not the indicated AS should be contacted.

As illustrated in FIG. 2, when the S-CSCF receives a message, it checks the stored IFCs. If the incoming message meets the conditions of the trigger point in an IFC, then the S-CSCF passes the message to the AS indicated by the IFC. Once the AS has dealt with the message, the message is returned to the S-CSCF and the next IFC is checked. An IFC can be accorded a priority number, so if more than one IFC relating to a user is stored at the S-CSCF, the IFCs are checked in the order of priority.

The interface between the S-CSCF and the AS is the IMS Service Control (ISC) interface, which uses SIP signalling to communicate between the AS and the S-CSCF.

3GPP IMS specification TS 24.229 v7.5.1 provides a mechanism that allows an AS to perform a change of target of the SIP request, by modifying the Request-URI (Uniform Resource Indicator) contained in the message. When the message is returned from the AS to the S-CSCF, the S-CSCF detects the change of request-URI and interrupts checking of the Initial Filter Criteria (IFC) evaluation, as shown in FIG. 3. The message is passed directly to outgoing request handling, and any lower priority IFCs are not checked, which prevents invocation of other ASs.

The original motivation for the mechanism arose from the requirement of a call forwarding service, which allows an AS to alter the destination address of the SIP request. At the time, it was not envisaged that any other service would require that the AS should change the Request-URI of the SIP request. However, there are now cases being considered that may require the AS to change the Request-URI of the SIP request, but which should not interrupt the IFC evaluation procedure at the S-CSCF. Examples of such cases include the following:

1. A user having an IMS Public User Identity (IMPU) may be using more than one UE. The AS receives a request that is addressed to the IMPU of a user, and selects a SIP User Agent (UA), typically a terminal of the user addressed with a Globally Routable UA URI (GRUU) or a Contact, as an endpoint. When the AS wants to initiate a terminating session with the User Equipment (UE) a problem arises if the IMPU assigned to the UE is shared by other UEs. To fully control which UE the terminating session request is sent to, the AS must change the target of the request from the IMPU to the address of the selected endpoint.
2. A similar issue arises when the AS changes the user's IMPU. This may be required, for example, when the AS receives an IMPU with TEL URI and sends another one with a SIP URI or vice versa.
3. The AS may be required to change the Request-URI of the incoming request from a SIP URI to a Tel URI. This change is needed as devices connected to the network using the Public Switched Telephone Network (PSTN) can only be contacted using telephone numbers.

In the above two cases, it may be desirable for the S-CSCF to continue IFC evaluation after the Request-URI in the message has been changed by an AS. This does not change the targeted user, but merely addresses the same user or a subset of the user's endpoints using an alternative address. This is different from the "call forwarding" scenario where the actual target user is changed, and is the primary reason why the existing mechanism of interrupting IFC evaluation in the event of a change of address is not suitable for these cases.

SUMMARY

According to a first aspect of the invention, there is provided a method of evaluating Initial Filter Criteria at a terminating Call Session Control Function in an IP Multimedia Subsystem network, the method comprising:

receiving a Session Initiation Protocol message, the Session Initiation Protocol message comprising a destination Uniform Resource Identifier;

as a result of applying an Initial Filter Criterion to the message, sending the message to an Application Server and suspending evaluation of further Initial Filter Criteria;

receiving the message returned from the Application Server;

determining whether or not the Uniform Resource Identifier has been changed by the Application Server;

if the Uniform Resource Identifier has been changed by the Application Server, then determining whether to resume evaluation of Initial Filter Criteria, and if the Uniform Resource Identifier has not been changed by the Application Server, then resuming evaluation of Initial Filter Criteria.

In this way, a decision is made as to whether or not to continue with IFC evaluation even if the destination Uniform Resource Identifier has been changed.

The step of determining whether to resume evaluating Initial Filter Criteria may comprise determining whether the Initial Filter Criterion has an associated target change override indicator, and if so then resuming evaluating Initial Filter Criteria. In this case, a target change override indicator is typically associated with an Initial Filter Criterion and stored as part of a user's profile.

Alternatively, the step of determining whether to resume evaluating Initial Filter Criteria may comprise determining whether the message received from the Application Server contains a target change override indicator, and if so then resuming evaluating Initial Filter Criteria. This allows an Application Server to decide whether or not to include a target change override indicator.

In an alternative method, the step of determining whether to resume evaluating Initial Filter Criteria may comprise determining if the destination Uniform Resource Identifier contained in the message received from the Application Server relates to an IP Multimedia Subsystem Public User Identity belonging to the same user as an IP Multimedia Subsystem Public User Identity contained in the received message, and if so then continuing with resuming evaluating Initial Filter Criteria.

According to a second aspect of the invention, there is provided a terminating Call Session Control Function for use in an IP Multimedia Subsystem network, the Call Session Control Function comprising:

means for receiving a Session Initiation Protocol message, the message comprising a destination Uniform Resource Identifier;

means for evaluating Initial Filter Criteria to apply to the message;

a transmitter for sending the message to an Application Server;

means for receiving the message returned from the Application Server;

means for determining whether or not the destination Uniform Resource Identifier has been changed by the Application Server; and means for determining, in the event that the destination Uniform Resource Identifier has been changed by the Application Server, whether to continue evaluating Initial Filter Criteria or whether to stop evaluating Initial Filter Criteria.

According to a third aspect of the invention, there is provided an Application Server comprising:

a receiver for receiving a message, the message comprising a destination Uniform Resource Identifier:

means for amending the Uniform Resource Identifier of the message;

means for including a target address override indicator in the message; and a transmitter for sending the message to a Call Session Control Function.

According to a fourth aspect of the invention, there is provided a method of handling a Session Initiation Protocol message at a terminating Call Session Control Function in an IP Multimedia Subsystem network, the method comprising:

receiving a Session Initiation Protocol message, the Session Initiation Protocol message comprising a destination Uniform Resource Identifier;

applying at least one Initial Filter Criterion to the message as a result of the application of the Initial Filter Criterion, sending the message to an Application Server;

receiving the message returned from the Application Server;

determining whether or not the returned message comprises a new target Uniform Resource Identifier if the returned message comprises a new target Uniform Resource Identifier, then replacing the destination Uniform Resource Identifier with the new target Uniform Resource Identifier.

This method allows all of the Initial Filter Criteria to be evaluated before changing the destination Uniform Resource Identifier, even where an Application Server invoked by a first Initial Filter Criterion of a plurality of Initial Filter Criteria wishes to change the destination Uniform Resource Identifier.

According to a fifth aspect of the invention, there is provided a Call Session Control Function for use in an IP Multimedia Subsystem network, the Call Session Control Function comprising:

means for receiving a Session Initiation Protocol message, the message comprising a destination Uniform Resource Identifier;

means for applying Initial Filter Criteria to the message;

a transmitter for sending the message to an Application Server;

means for receiving the message returned from the Application Server;

means for determining whether or not the body of the returned message comprises a new target Uniform Resource Identifier; and means for replacing the destination Uniform Resource Identifier in the message with the new target Uniform Resource Identifier.

DETAILED DESCRIPTION

Figure 1:
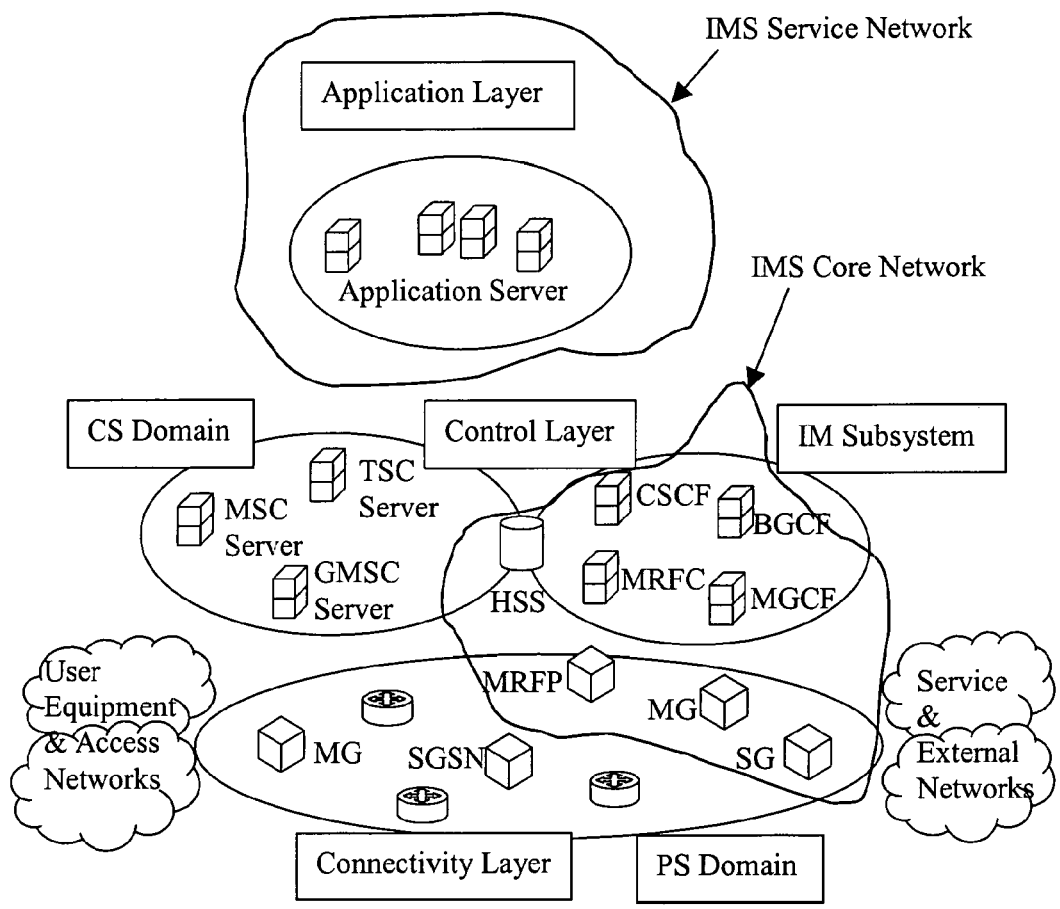
FIG. 1 illustrates schematically how the IMS fits into the mobile network architecture in the case of a 3GPP PS access domain.
Figure 2:
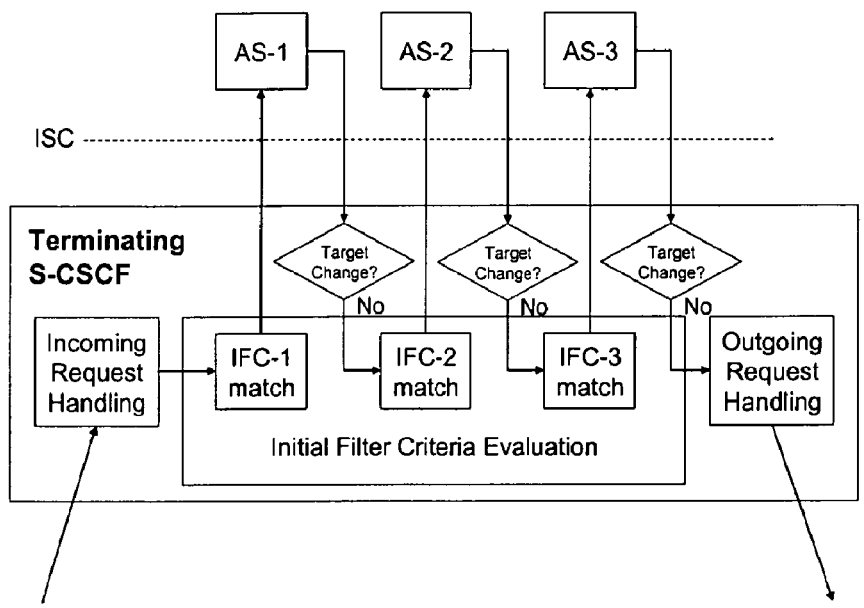
FIG. 2 illustrates schematically the invocation of Application Servers by the S-CSCF in response to Initial Filter Criteria being met.
Figure 3:
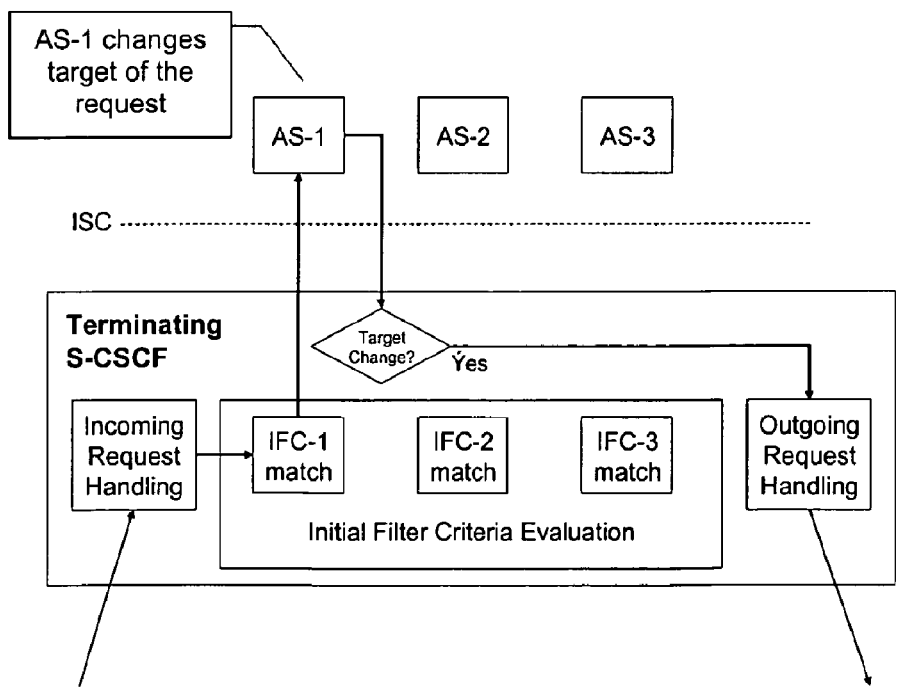
FIG. 3 illustrates schematically the invocation of an Application Server by the S-CSCF in response to Initial Filter Criteria being met, where the Application Server changes the target URI.
Figure 4:
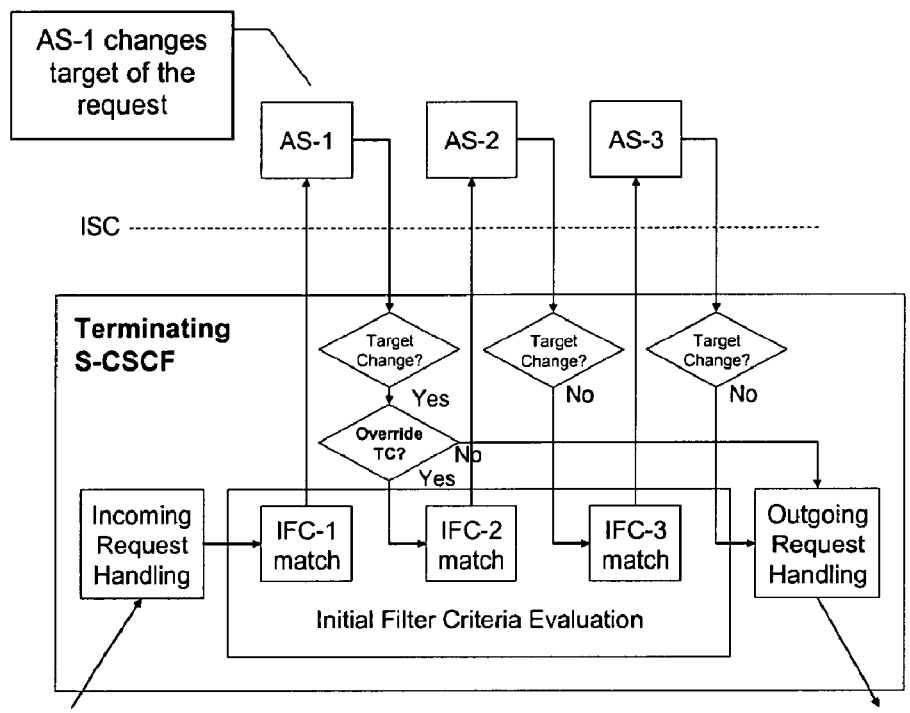
FIG. 4 illustrates schematically the invocation of Application Servers by the S-CSCF according to the present invention.

The S-CSCF is able to determine whether the Request-URI has been changed by an AS. If it is determined that the Request-URI has been changed, then the S-CSCF decides whether or not to continue evaluation of Initial Filter Criteria (IFC). This is illustrated in FIG. 4. The first Initial Filter Criterion IFC-1 is applied to an incoming message at the S-CSCF. The message is passed to the Application Server, AS-1, indicated in IFC1. The message is then returned to the S-CSCF from AS-1. The S-CSCF determines whether or not the Request-URI has been changed. If not, then the next Initial filter Criteria, IFC-2, is applied to the message. If the S-CSCF determines that the Request-URI has changed, then the S-CSCF determines whether or not to resume IFC evaluation. If not, then the message is passed directly to outgoing request handling in the S-CSCF. Alternatively, if the S-CSCF determines that IFC evaluation should be resumed, then the message with the amended request-URI is passed to IFC-2 for evaluation. This process continues for each IFC.

Note that in FIG. 4, the check to ascertain whether the Request-URI has been changed is shown as occurring before the check to see whether to resume IFC evaluation or to pass the message directly to outgoing request handling in the S-CSCF. The order of these two checks may be reversed.

There are several different ways in which S-CSCF can determine whether or not to continue the IFC evaluation once the Request-URI of the message has been changed. Three possible ways are as follows:

1. A target change override indication is included as part of the user profile stored in the HSS and downloaded to the S-CSCF when the user registers with the network. The target change override indication is associated with a particular IFC. When the S-CSCF receives a SIP request returned with a changed target by an AS invoked by means of the IFC with the target change override indication, the S-CSCF will not interrupt the IFC evaluation but resume the procedure despite the change of the target.
2. A target change override indication is introduced as part of the signalling over the ISC interface between the S-CSCF and the AS. The AS that changes the request target may also include the target change override indication in the SIP request sent to the S-CSCF. The target change override indication may be in any suitable part of the SIP message, including a header or the body of the message. The S-CSCF reads the target change override indication in the SIP message and resumes IFC evaluation. There are further alternative methods by which the AS may signal the target change and the override indication to the S-CSCF over ISC as follows:
   a. The AS changes the Request-URI and includes an explicit target address change override indication in the SIP request;
   b. The AS keeps the Request-URI unchanged but the new target address is sent in the SIP request (e.g. in a SIP header);
3. New logic is introduced in the S-CSCF to analyse the changed target address of the request to determine whether to continue or stop the IFC evaluation. This logic determines whether the changed target is another IMPU belonging to the user, or the target is derived from an IMPU belonging to the user or whether it is a SIP User Agent (UA) currently registered for the user. If any of these conditions is met, the S-CSCF resumes IFC evaluation, otherwise the SIP message is passed to outgoing request handling.

These three examples above will now be described in more detail.

1. Target Change Override Indication Associated with the IFC in the User Profile.

Figure 5:
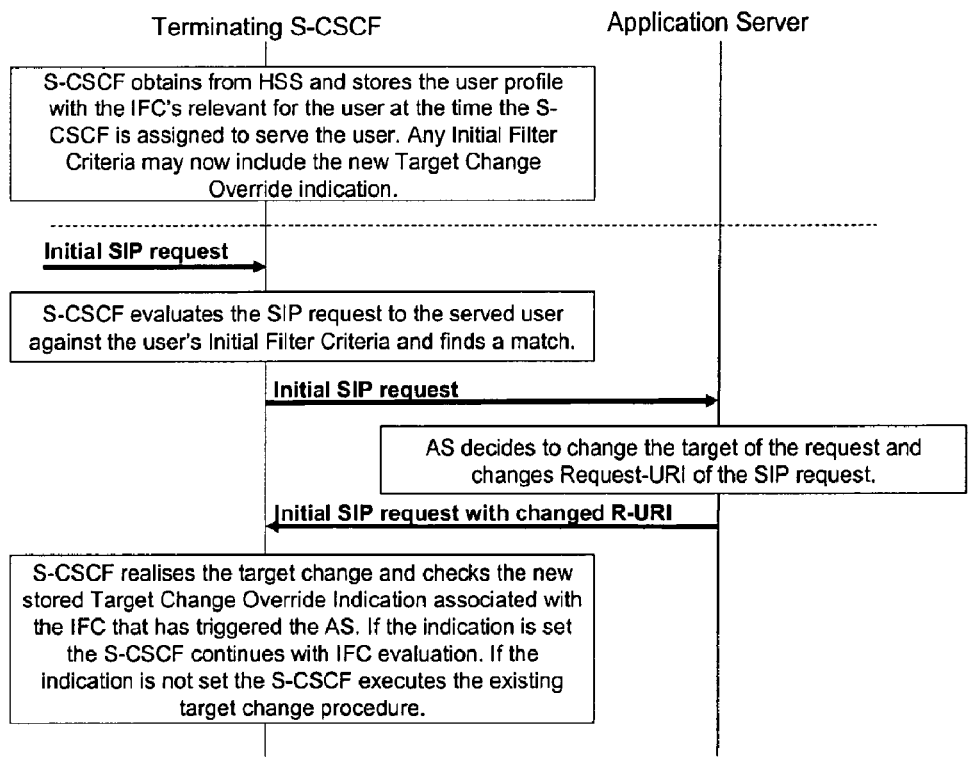
FIG. 5 shows the signalling sequence when a target change override indication is associated with the IFC in the user profile.

The signalling sequence for this embodiment is illustrated in FIG. 5.

1.1. A target change override indication is included as part of the user profile in the HSS. The target change override indication is associated with an IFC which points to a particular AS. The target change override indication is downloaded to the S-CSCF as part of the user profile at the time the S-CSCF is assigned to the user (typically at user registration or when terminating a request to an unregistered user with terminating services is received). The target change override indication is thus an addition to the existing user profile stored in the HSS and cached by the S-CSCF.

1.2. When the S-CSCF receives a terminating initial SIP request for the served user, it executes the existing IFC evaluation procedure by matching the received request against the stored IFCs in their predetermined priority order. If the request and an IFC match, the evaluation is interrupted and the request is forwarded to the AS pointed at by the matching IFC.

1.3. When the AS receives the SIP request and decides to change the target of the request, it includes the new target in the Request-URI of the SIP request, and returns the SIP request back to the S-CSCF.

1.4. When the S-CSCF receives the SIP request returned by the AS it checks whether or not the request target has been changed, and whether a target change override indication is associated with the IFC that triggered the message to be sent to the AS. The S-CSCF checks wither the request target has been changed by comparing the request-URI of the SIP message sent to the AS with the Request-URI of the SIP message received from the AS. The following actions may result:

1.4.a. If the request target has not been changed, IFC evaluation is resumed as per step 1.5 below;
   1.4.b. If the target change override indication for the AS pointed at by the IFC that triggered this invocation is set, IFC evaluation is resumed as per step 1.5;
   1.4.c. If the request target has been changed and the target change override indication for the AS pointed at by the IFC that triggered this invocation is not set, then IFC evaluation is not resumed and the message is passed to outgoing request handling;

1.5. Where the S-CSCF is to resume IFC evaluation as required by steps 4a and 4b above, the S-CSCF resumes IFC evaluation by matching the SIP request received from the AS against the stored IFCs from the next IFC in the predetermined priority order. If the request and an IFC match, the evaluation is interrupted and the request is forwarded to the AS pointed at by the matching IFC. The procedure continues from step 3.

2a. Target Change Override Indication signalled by the AS

Figure 6:
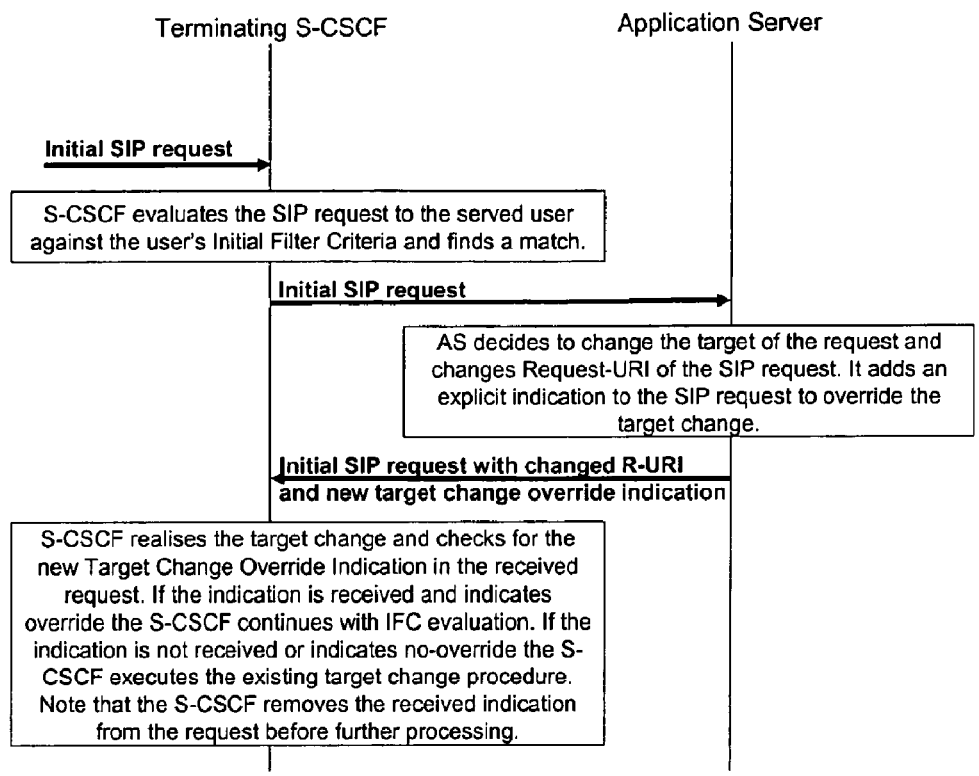
FIG. 6 shows the signalling sequence when a target change override indication signalled by the Application Server.

The signalling sequence for this embodiment is illustrated in FIG. 6 and described as follows:

2a.1. When the S-CSCF receives a terminating initial SIP request for the served user it executes the existing IFC evaluation procedure by matching the received request against the stored IFCs in the user's predetermined priority order. If the SIP request and an IFC match, the evaluation is interrupted and the request is forwarded to the AS indicated by the matching IFC.

2a.2. When the AS receives the SIP request and decides to change the target of the request it forwards the SIP request back to the S-CSCF with the new target in the Request-URI of the SIP request and it also includes a new target change override indication in the SIP request to instruct the S-CSCF to continue the IFC evaluation.

2a.3. When the S-CSCF receives the SIP request returned by the AS it determines whether the request target has changed and if a target change override indication is included in the received request. The S-CSCF removes from the request any received target change override indication before further processing in step 2.4 or before executing the outgoing request handling. As a result of step 2.3, the following actions may occur:

2a.3.a. If the request target has not been changed, then IFC evaluation is resumed as per step 2a.4;

2a.3.b. If the request target has been changed and a target change override indication indicating "override" is received in the request from the AS, then IFC evaluation is resumed as per step 2a.4;

2a.3.c. If the request target has been changed but the SIP message received from the AS does not contain a target change override indication, then IFC evaluation is not resumed and the message is passed to outgoing request handling.

2a.4. If IFC evaluation is resumed, the S-CSCF resumes the existing IFC evaluation procedure by matching the received request against the stored IFCs from the next IFC in the predetermined priority order. If the request and an IFC match, the evaluation is interrupted and the request is forwarded to the AS pointed at by the matching IFC. The procedure continues from step 2.2.

2b. New Target Signalled by the AS

Figure 7:
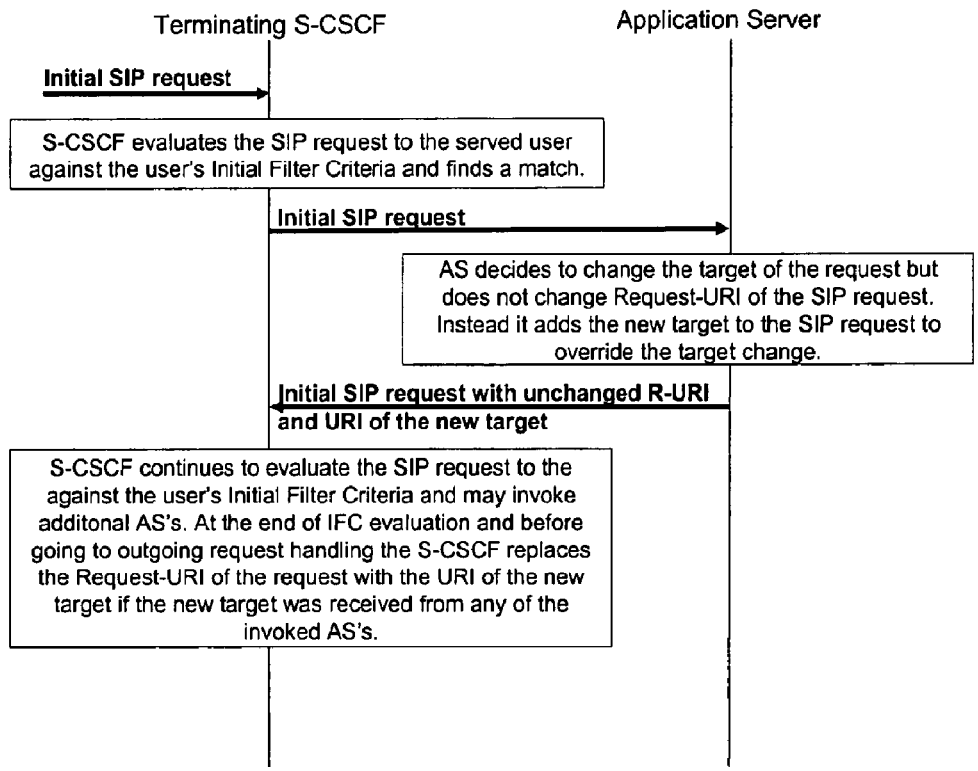
FIG. 7 shows the signalling sequence when a new target is signalled by the Application Server.

The signalling sequence for this embodiment is illustrated in FIG. 7 and described as follows:

2b.1. When the S-CSCF receives a terminating initial SIP request for the served user it executes the existing IFC evaluation procedure by matching the received request against the stored IFCs in their predetermined priority order. If the request and an IFC match, the evaluation is interrupted and the request is forwarded to the AS pointed at by the matching IFC.

2b.2. When the AS receives the SIP request and decides to change the target of the request it forwards the SIP request back to the S-CSCF but does not change the Request-URI of the request. Instead it adds the new target into the SIP request. The new target may be included in a new header, or alternatively in the message body.

2b.3. The SIP request is returned to the S-CSCF by the AS, with an unchanged Request-URI. The S-CSCF therefore resumes IFC evaluation as per the existing procedure, by matching the received request against the stored IFCs from the next IFC in the predetermined priority order. If the request and an IFC match, the evaluation is interrupted and the request is forwarded to the AS pointed at by the matching IFC. The procedure continues from step 3.2.

2b.4. At the end of the IFC evaluation procedure and prior to executing the outgoing request handling, the S-CSCF checks for the presence of a new target in the SIP request. If a new target is present, the S-CSCF will put it in the Request-URI of the request and remove it from the request. It then proceeds with its normal outgoing request handling procedure on the basis of the new target.

3. New Target Change Override Logic in the S-CSCF

Figure 8:
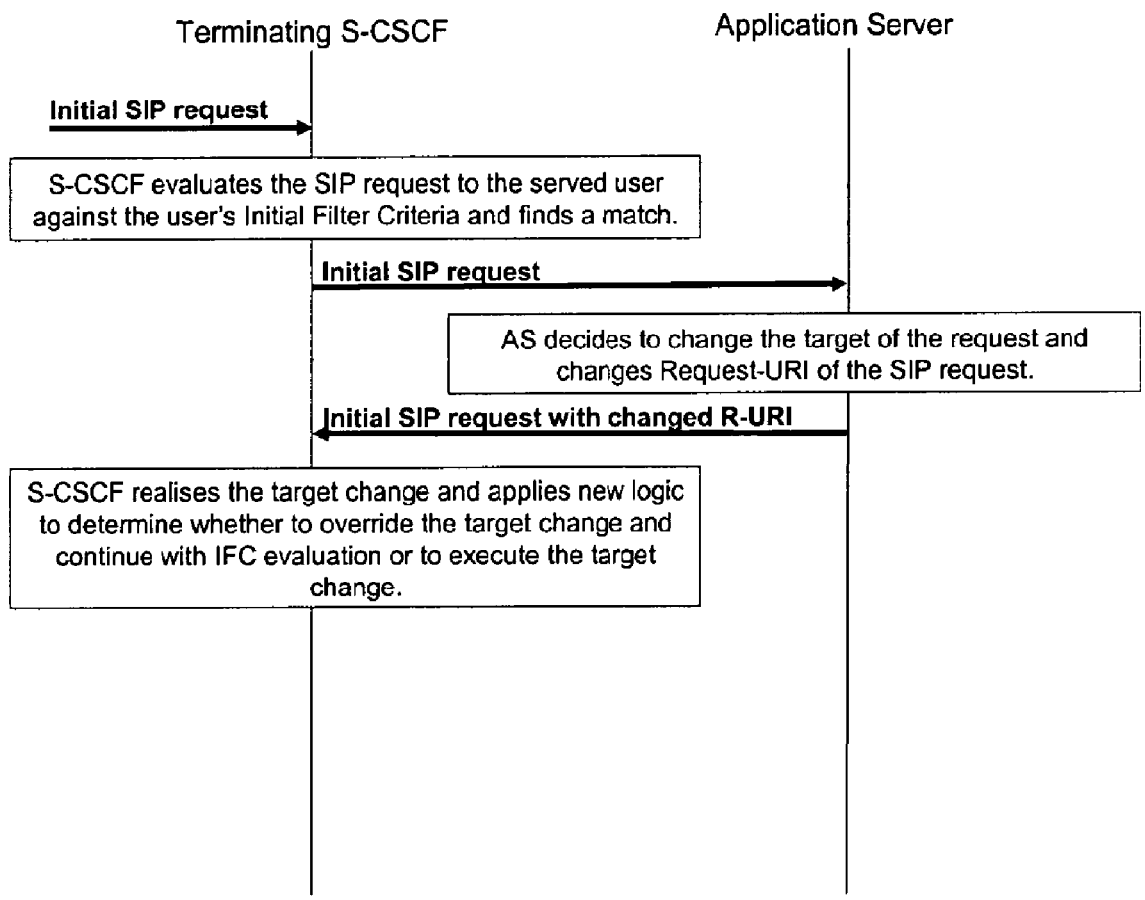
FIG. 8 shows the signalling sequence where target change override logic is used in the S-CSCF.

The signalling sequence for this embodiment is illustrated in FIG. 8 and described as follows:

3.1. When the S-CSCF receives a terminating initial SIP request for the served user it executes the existing IFC evaluation procedure by matching the received request against the stored IFCs in their predetermined priority order. If the request and an IFC match, the evaluation is interrupted and the request is forwarded to the AS pointed at by the matching IFC.

3.2. The AS receives the SIP request and decides to change the target of the request. The request message is forwarded back to the S-CSCF with the new target in the Request-URI of the SIP request.

3.3. When the S-CSCF receives the SIP request returned by the AS it determines whether the request target has been changed by the AS, if so the S-CSCF applies logic to determine whether to override the target change. The logic is based on the S-CSCF's knowledge of all the identities belonging to the user, including the user's GRUUs, in addition to the served user's currently registered contact addresses. This new logic will determine if the changed target belongs to the served user.

3.3.a. If the request target has not been changed, then IFC evaluation is resumed as per step 3.4;

3.3.b. If the request target has been changed and the S-CSCF determines that the new target belongs to the served user, then IFC evaluation is resumed as per step 3.4;

3.3.c. If the request target has been changed and the S-CSCF determines that the new target does not belong to the served user, then IFC evaluation is not resumed and the message is send for outgoing request handling;

3.4. Where the S-CSCF determines that IFC evaluation should be resumed, the S-CSCF resumes the existing IFC evaluation procedure by matching the received request against the stored IFCs from the next IFC in the predetermined priority order. If the request and an IFC match, the evaluation is interrupted and the request is forwarded to the AS pointed at by the matching IFC. The procedure continues from step 3.2.

It will be appreciated by the person of skill in the art that various modifications may be made to the above described embodiments without departing from the scope of the present invention.

The invention claimed is:

1. A method of evaluating Initial Filter Criteria at a terminating Call Session Control Function in an IP Multimedia Subsystem network, the method comprising:
   receiving a Session Initiation Protocol message, the Session Initiation Protocol message including an original Request-Uniform Resource Identifier;
   applying an Initial Filter Criterion to the message;
   as a result of applying the Initial Filter Criterion to the message, sending the message to an Application Server and suspending evaluation of further Initial Filter Criteria;
   receiving the message returned from the Application Server;
   determining whether the original Request-Uniform Resource Identifier has been changed by the Application Server to a changed Request-Uniform Resource Identifier;
   when the original Request-Uniform Resource Identifier has been changed by the Application Server:
      determining whether to resume evaluation of Initial Filter Criteria;
      upon determining not to resume evaluation of Initial Filter Criteria, passing the message directly to outgoing message handling in the Call Session Control Function; and
      upon determining to resume evaluation of Initial Filter Criteria, resuming evaluation of Initial Filter Criteria utilizing the changed Request-Uniform Resource Identifier; and
   when the original Request-Uniform Resource Identifier has not been changed by the Application Server, resuming evaluation of Initial Filter Criteria utilizing the original Request-Uniform Resource Identifier.

2. The method according to claim 1, wherein the step of determining whether to resume evaluating Initial Filter Criteria comprises determining whether the Initial Filter Criterion has an associated target change override indicator, and if so, resuming evaluating Initial Filter Criteria utilizing the changed Request-Uniform Resource Identifier.

3. The method according to claim 1, wherein the step of determining whether to resume evaluating Initial Filter Criteria comprises determining whether the message received from the Application Server contains a target change override indicator, and if so, resuming evaluating Initial Filter Criteria utilizing the changed Request-Uniform Resource Identifier.

4. The method according to claim 1, wherein the step of determining whether to resume evaluating Initial Filter Criteria comprises determining whether the changed Request-Uniform Resource Identifier contained in the message received from the Application Server relates to an IP Multimedia Subsystem Public User Identity belonging to the same user as an IP Multimedia Subsystem Public User Identity contained in the received Session Initiation Protocol message, and if so, resuming evaluating Initial Filter Criteria utilizing the changed Request-Uniform Resource Identifier.

5. The method according to claim 1, further comprising, after Initial Filter Criteria evaluation is complete, replacing the original Request-Uniform Resource Identifier with the changed Request-Uniform Resource Identifier received from the Application Server, whenever the original Request-Uniform Resource Identifier has been changed by the Application Server.

6. A terminating Call Session Control Function for use in an IP Multimedia Subsystem network, the Call Session Control Function comprising a processor coupled to a non-transitory memory that stores computer program instructions, wherein when the processor executes the computer program instructions, the Call Session Control Function is caused to:
  receive a Session Initiation Protocol message, the message including an original Request-Uniform Resource Identifier;
  evaluate Initial Filter Criteria to apply to the message;
  send the message to an Application Server;
  receive the message returned from the Application Server;
  determine whether the original Request-Uniform Resource Identifier has been changed by the Application Server;
  when the original Request-Uniform Resource Identifier has been changed by the Application Server:
    determine whether to continue evaluating Initial Filter Criteria;
    upon determining not to continue evaluating Initial Filter Criteria, pass the message directly to outgoing message handling in the Call Session Control Function; and
    upon determining to continue evaluating Initial Filter Criteria, resume evaluation of Initial Filter Criteria utilizing the changed Request-Uniform Resource Identifier; and
  resume evaluation of Initial Filter Criteria when the original Request-Uniform Resource Identifier has not been changed by the Application Server.

7. The terminating Call Session Control Function according to claim 6, wherein the Call Session Control Function is also caused to replace the original Request-Uniform Resource Identifier with the changed Request-Uniform Resource Identifier received from the Application Server after Initial Filter Criteria evaluation is complete, whenever the original Request-Uniform Resource Identifier has been changed by the Application Server.

8. The terminating Call Session Control Function according to claim 6, wherein when determining whether to resume evaluating Initial Filter Criteria, the Call Session Control Function is configured to determining whether the Initial Filter Criterion has an associated target change override indicator, and if so, to resume evaluating Initial Filter Criteria utilizing the changed Request-Uniform Resource Identifier.

9. The terminating Call Session Control Function according to claim 6, wherein when determining whether to resume evaluating Initial Filter Criteria, the Call Session Control Function is configured to determine whether the message received from the Application Server contains a target change override indicator, and if so, to resume evaluating Initial Filter Criteria utilizing the changed Request-Uniform Resource Identifier.

10. The terminating Call Session Control Function according to claim 6, wherein when determining whether to resume evaluating Initial Filter Criteria, the Call Session Control Function is configured to determine whether the changed Request-Uniform Resource Identifier contained in the message received from the Application Server relates to an IP Multimedia Subsystem Public User Identity belonging to the same user as an IP Multimedia Subsystem Public User Identity contained in the received Session Initiation Protocol message, and if so, to resume evaluating Initial Filter Criteria utilizing the changed Request-Uniform Resource Identifier.

* * * * *